United States Patent
Pinto et al.

(10) Patent No.: US 10,279,513 B2
(45) Date of Patent: May 7, 2019

(54) SHAPING PROCESS FOR PMI FOAM MATERIALS AND/OR COMPOSITE COMPONENTS PRODUCED THEREFROM

(71) Applicant: Evonik Roehm GmbH, Darmstadt (DE)

(72) Inventors: Jorge Pinto, Darmstadt (DE); Matthias Alexander Roth, Mobile, AL (US); Joern Daniel Suendermann, Darmstadt (DE); Arnim Kraatz, Darmstadt (DE); Dieter Schlager, Altershausen (DE); Rainer Zimmermann

(73) Assignee: Evonik Roehm GmbH, Darmstadt (DE)

( * ) Notice: Subject to any disclaimer, the term of this patent is extended or adjusted under 35 U.S.C. 154(b) by 275 days.

(21) Appl. No.: 14/416,777

(22) PCT Filed: Jun. 24, 2013

(86) PCT No.: PCT/EP2013/063137
§ 371 (c)(1),
(2) Date: Jan. 23, 2015

(87) PCT Pub. No.: WO2014/016068
PCT Pub. Date: Jan. 30, 2014

(65) Prior Publication Data
US 2015/0174798 A1 Jun. 25, 2015

Related U.S. Application Data

(60) Provisional application No. 61/675,011, filed on Jul. 24, 2012.

(51) Int. Cl.
*B29C 43/52* (2006.01)
*B32B 5/18* (2006.01)
(Continued)

(52) U.S. Cl.
CPC .......... *B29C 43/52* (2013.01); *B29C 44/5627* (2013.01); *B29C 44/5636* (2013.01);
(Continued)

(58) Field of Classification Search
CPC ...................................................... B29C 43/52
See application file for complete search history.

(56) References Cited

U.S. PATENT DOCUMENTS

| 5,254,402 A | 10/1993 | Okubo et al. |
| 5,976,288 A | 11/1999 | Ekendahl |

(Continued)

FOREIGN PATENT DOCUMENTS

| CN | 102026803 A | 4/2011 |
| EP | 0 488 762 | 6/1992 |

(Continued)

OTHER PUBLICATIONS

Combined Office Action and Search Report dated Dec. 30, 2015 in Chinese Patent Application No. 201380030574.7 (submitting English translation only).

(Continued)

*Primary Examiner* — Larry W Thrower
(74) *Attorney, Agent, or Firm* — Oblon, McClelland, Maier & Neustadt, L.L.P.

(57) ABSTRACT

A disclosed process includes steps of heating a foamed material by irradiation with near infrared radiation having a wavelength between 0.78 and 1.40 μm to form a heated material, forming the heated material with a forming tool to obtain a formed material, and cooling the formed material and demolding to obtain a final workpiece. The foamed material may be constructed as a composite ply construction including an outer material and a foamed core between the (Continued)

Figure 1:
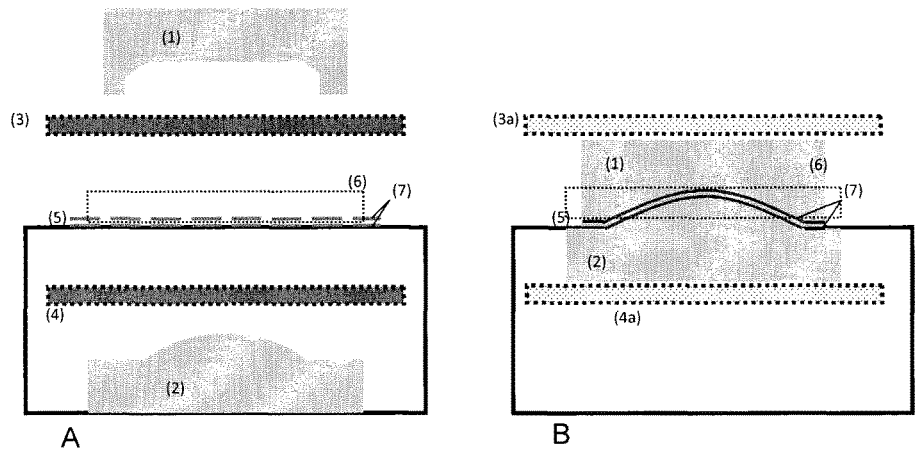

outer material. The foamed material may contain a poly(meth)acrylimde, a polypropylene or a highly-crosslinked polyurethane.

14 Claims, 2 Drawing Sheets

(51) Int. Cl.
  *B29C 44/56*   (2006.01)
  *C08J 9/36*   (2006.01)
  *B29C 51/42*   (2006.01)
  *B32B 27/06*   (2006.01)
  *B29C 35/08*   (2006.01)
  *B29K 75/00*   (2006.01)
  *B29K 105/04*   (2006.01)
  *B29C 51/06*   (2006.01)
  *B29C 51/14*   (2006.01)
  *B29K 105/12*   (2006.01)
  *B29K 623/00*   (2006.01)
  *B29K 627/06*   (2006.01)
  *B29K 23/00*   (2006.01)
  *B29K 33/00*   (2006.01)
  *B29K 105/24*   (2006.01)
  *B29K 79/00*   (2006.01)

(52) U.S. Cl.
  CPC ........ *B29C 44/5681* (2013.01); *B29C 51/421* (2013.01); *B32B 5/18* (2013.01); *B32B 27/065* (2013.01); *C08J 9/365* (2013.01); *B29C 51/06* (2013.01); *B29C 51/14* (2013.01); *B29C 2035/0822* (2013.01); *B29C 2791/006* (2013.01); *B29K 2023/12* (2013.01); *B29K 2033/26* (2013.01); *B29K 2075/00* (2013.01); *B29K 2079/08* (2013.01); *B29K 2105/04* (2013.01); *B29K 2105/12* (2013.01); *B29K 2105/24* (2013.01); *B29K 2623/06* (2013.01); *B29K 2623/12* (2013.01); *B29K 2627/06* (2013.01); *B29K 2995/0025* (2013.01); *B32B 2260/021* (2013.01); *B32B 2266/025* (2013.01); *B32B 2266/0242* (2013.01); *B32B 2266/0278* (2013.01); *C08J 2323/12* (2013.01); *C08J 2333/24* (2013.01); *C08J 2375/04* (2013.01)

(56) References Cited

U.S. PATENT DOCUMENTS

| | | | |
|---|---|---|---|
| 2005/0182239 A1* | 8/2005 | Lang | B29C 44/5636 528/480 |
| 2008/0226876 A1 | 9/2008 | Roth | |
| 2009/0284048 A1* | 11/2009 | Dong | B29C 44/569 296/214 |
| 2010/0189954 A1 | 7/2010 | Roth | |
| 2012/0141726 A1 | 6/2012 | Keller et al. | |
| 2012/0261853 A1* | 10/2012 | Piedmont | B29C 51/16 264/101 |
| 2014/0134422 A1 | 5/2014 | Kraatz et al. | |

FOREIGN PATENT DOCUMENTS

| | | |
|---|---|---|
| WO | WO 2009/137926 A1 | 11/2009 |
| WO | WO 2012/028353 A1 | 3/2012 |

OTHER PUBLICATIONS

International Search Report dated Aug. 16, 2013 in PCT/EP13/063137 Filed Jun. 24, 2013.

* cited by examiner

SHAPING PROCESS FOR PMI FOAM MATERIALS AND/OR COMPOSITE COMPONENTS PRODUCED THEREFROM

CROSS-REFERENCE TO RELATED APPLICATIONS

This application is a National Stage of PCT/EP2013/063137 filed on Jun. 24, 2013, which is based upon and claims the benefit of priority to U.S. Provisional Application No. 61/675,011 filed on Jul. 24, 2012.

FIELD OF THE INVENTION

The present invention relates to a novel process which, for example, is useful for producing composite materials having cores composed of rigid foams. The invention has the considerable advantage here that both the foam material and the outer layer are freely choosable. More particularly, the present process can cope with outer layers whose processing temperature differs distinctly from those of the core material.

The present invention further relates to a process whereby, in a second embodiment, integral foamed structures can be partially consolidated. In a third embodiment, two or more workpieces of a foamed material can be fused together to produce a hollow article having particularly high-grade joints. This can be done with or without outer layers.

The present invention is further very useful for processing foam materials by vacuum forming.

PRIOR ART

Various processes for producing fiber-reinforced plastics comprising a rigid foam or for forming rigid foams are described in the prior art in general terms. Rigid foams in the context of this invention are foams which unlike commercially available PU or polystyrene foams for example are not mechanically deformable by minimal forces to subsequently recover. Examples of rigid foams are in particular PP, PMMA or highly crosslinked PU foams. Poly(meth)acrylimide (PMI), for example as marketed by Evonik under the name Rohacell®, is a rigid foam which is particularly strong.

A well-known process for producing the composite materials described is to form the outer layers, then introduce the foam raw material and finally to foam the foam raw material. Such a process is described in U.S. Pat. No. 4,933,131 for example. One disadvantage of this process is that the foaming is usually very nonuniform. This holds particularly for materials such as PMI, which can at best be added as granules. A further disadvantage of this process is that the outer layers would have to be removed again to form a purely foam material of construction. In the case of composite structural components, in turn, adherence between the outer layers and the foam core is often insufficient for mechanically stressed structural components.

In Passaro et al., Polymer Composites, 25(3), 2004, p. 307ff a process is described wherein a PP foam core material is joined to a fiber-reinforced plastic in a compression mold which heats the foam core material specifically only at the surface in order that good bonding to the outer material may be achieved. In Grefenstein et al., International SAMPE Symposium and Exhibition, 35 (1, Adv. Materials: Challenge Next Decade), 1990, pp. 234-44 an analogous process is described for producing sandwich materials having a honeycomb core material or a PMI foam core. Forming is not possible with either of these two processes, however, only the production of sandwich materials in sheet form.

WO 02/098637 describes a process wherein a thermoplastic outer material is applied as melt to the surface of a foam core material and then molded together with the foam core in a twin sheet process to form a composite molding and then the thermoplastic is cooled down such that the outer material rigidizes in the mold. However, only a limited number of materials can be combined using this process. No fiber-reinforced outer materials are obtainable for instance. The process can also not be used to purely form a foam workpiece without outer materials. Furthermore, the choice of foam materials is restricted to materials that are elastically formable at low temperatures. A rigid foam would sustain too much structural damage in such a process where the foam material is not heated up uniformly.

The process described in EP 0 272 359 is very similar. A foam core preform is first cut into shape and placed in a mold. Then, the melt of the thermoplastic material is injected onto the surface. The temperature is then raised to expand the foam core preform, causing compression to the surface of the outer material. This process does provide better adherence to the outer material, but is more costly and inconvenient on account of the additional step of initial forming and altogether is distinctly more limited with regard to realizable shapes.

In W. Pip, Kunststoffe, 78(3), 1988, pp. 201-5 a process is described for producing shaped composites having fiber-reinforced outer layers and a PMI foam core in a compression mold. In this process, the individual layers are joined together in a heated compression mold while slight forming is effected by the uppermost layers in the locally heated foam material being compressed. Also described is a process wherein a shape can be produced by secondary foaming within the mold. The disadvantages of such a process were discussed above. As a third variant, a process is disclosed wherein the material is subjected to elastic compression while compression molding a preheated foam material. Preheating is done in an oven. However, this process is disadvantageous in that many foam materials require very high temperatures for thermo-elastic forming. PMI foams for instance require temperatures of 185° C. at least. It is further necessary for the core material to have been appropriately heated up throughout its entire corpus to avoid material failures. However, at such temperatures, particularly since these are only possible with prolonged heating for several minutes if they are to be uniformly distributed, many outer materials such as PP for example would be so severely damaged that the process cannot be carried out.

In U. Breuer, Polymer Composites, 1998, 19(3), pp. 275-9 a slightly modified process of the third variant from Pip, discussed above, is disclosed for PMI foam cores. The PMI foam core and the fiber-reinforced outer materials are heated up using an IR heat lamp. Such IR heat radiators, which emit light at wavelengths in the range between 3 and 50 µm (IR-C or MIR radiation) in particular, are particularly useful for heating the substrate quickly. However, the energy input, which is desired, is very high and so at the same time causes damage to many outer materials, such as PP for example. Accordingly, only polyamide 12 (PA12) is disclosed in Breuer et al. as possible matrix material for the outer layers. PA12 is readily heatable to above 200° C. without the plastic being damaged. Simultaneous forming of the foam core is not possible in this method of operation, since the thermal radiation of this IR spectrum does not penetrate into the foam matrix and hence no thermoplastically formable state is obtained.

Problem

Against the background of the prior art discussed, the present invention accordingly has for its object to provide a novel process whereby rigid foamed materials can be rapidly and simply shaped without structural damage and/or be processed together with outer layers, especially with thermoplastic materials, into composites.

The present invention has more particularly for its object to provide a process wherein these composite materials are produced in a forming operation and at the same time the choice of surface material is relatively free without this surface material being damaged during processing.

The process shall further be useful for partially consolidating foamed materials with or without outer material. The process shall also be useful for producing hollow articles from two or more foamed materials with or without outer layers. The process shall further be modifiable such that it can be combined with a vacuum-forming operation.

Furthermore, irrespective of the individual embodiments posed as objects, the novel process shall allow fast cycle times of distinctly below 10 min.

Further objects not explicitly discussed here may become apparent hereinbelow from the prior art, the description, the claims or exemplary embodiments.

Solution

The objects are achieved by a novel process for forming foamed materials. This novel process is particularly useful for forming rigid foams as of highly crosslinked polyurethane (PU), polypropylene (PP) or of poly(meth)acrylimide, especially of polymethacrylimide (PMI). The process comprises the steps of:
a) optional composite ply layup with outer materials and a foam core thereinbetween,
b) heating the foamed material by irradiation with near infrared radiation (NIR radiation) having a wavelength between 0.78 and 1.40 µm,
c) forming with a forming tool,
d) cooling and demolding the final workpiece.

Two different embodiments are possible here. In the first, the tool for heating with the NIR radiation and the forming tool are separate from each other. The process in this case comprises the steps of:
a) optional composite ply layup with outer materials and a foam core thereinbetween,
b1) introduction into the machine-side active region of the heating fields,
b2) heating the foamed material by irradiation with near infrared radiation (NIR radiation) having a wavelength between 0.78 and 1.40 µm,
c1) transferring the foamed material into a forming tool,
c2) forming with the tool, and
d) cooling and demolding the final workpiece.

In a second embodiment, the heating device for irradiating with NIR radiation is an integral constituent of the forming tool:
a) optional composite ply layup with outer materials and a foam core thereinbetween,
b1) introduction into a forming tool equipped with a removable heating field,
b2) heating the foamed material by irradiation with near infrared radiation (NIR radiation) having a wavelength between 0.78 and 1.40 µm,
c1) removing the heat from the operating range of the forming tool,
c2) forming with the tool, and
d) cooling and demolding the final workpiece.

Process steps b1) and b2) are to be understood as subsidiary steps of process step b) in the above embodiment. The same holds for process steps c1) and c2) in relation to process step c).

Surprisingly, the gentle heating of the material in process step b) (or, as the case may be, b2)) was found to evoke plastic formability by a uniform input of heat without the material sustaining any damage at the same time. Especially the damage to the rigid foam surface observed on heating in an oven for example does not occur on proper implementation of the present process. The thermal radiation due to the NIR spectrum used passes through the gas phase in the foam cells without being absorbed and effectuates direct heating of the cell wall matrix.

In a particular embodiment of the process according to the invention, the forming in step d) is effected using a twin sheet process under reduced pressure, i.e., in vacuo. The twin sheet apparatus used is configured such that it can be used as a compression-molding machine.

The principle of the twin sheet process is that two or more workpieces are in one process step formed in vacuo, i.e., under reduced pressure, and at the same time become fused together without additives such as adhesives, welding assistants or solvents. This process step is performable in high cycle times, economically and environmentally friendly. The present inventors found that, surprisingly, this process by including the additional step of preheating the workpieces by irradiation with –NIR radiation having a wavelength between 0.78 and 1.40 µm in step b) can also be used for processing the abovementioned rigid foams which appear to be unsuitable for this, to judge by the prior art. The relatively rapid heating which is achievable with the radiation mentioned provides a stressless, uniform distribution of heat throughout the workpiece. And the radiation can be varied in intensity within the recited range depending on the foamed material used. When outer materials are used in addition, the temperature of the heating fields and their intensity are modified such that the foam core and the outer materials are conjointly formed and bonded together even at different processing and forming temperatures. Such adaptations are made by a person skilled in the art with minimal experimentation.

One immense advantage of the process according to the invention is that it can be carried out in an environmentally benign manner and in very high cycle times while at the same time a plurality of steps are combined in one operation. And this process, which is novel in principle, gives rise to a whole series of variants which can each be used to produce completely novel products:

In a first variant, the forming step d) provides a local consolidation of the foamed material. Novel products are made possible by such a local consolidation. Shaped articles comprising a rigid foam with local consolidations are more versatile in use and more stable as a whole. Novel shapes can also be achieved. Such a product is also advantageous because reinforcements, inserts or screw couplings can be introduced particularly in the consolidated regions to ensure harmonic introduction of forces from the technical periphery. Such inserts or screw couplings render the foamed materials subsequently simple to further process in vehicle or aircraft construction. Such regions often also perform better in an adhered or welded bond. Such a variant of the process according to the present invention can be carried out with cycle times of below 5 min for PMI foams for example. A particular surprise with this variant is that, to judge by the prior art, such a structural component could not be produced in a single-step process.

In a second modification to the process of the present invention, step d) comprises a twin sheet process.

This variant of the process according to the present invention is particularly preferable when the foamed material is covered in step a) with an outer material on one side or both sides and the twin sheet process thus provides a composite material having a one-sided or both-sided outer layer and a rigid foam core. This second variant can be carried out in cycle times of below 6 minutes.

Surprisingly, the choice of outer material is relatively free. One can opt for example for pure thermoplastics, for wovens or knits or composites thereof, e.g., so-called organopanels or -sheets, or plastic-coated textile backings such as, for example, artificial leather. The outer material preferably comprises a fiber-reinforced plastic. The fibers may in turn be for example aramid, glass, carbon, polymeric or textile fibers. The plastic may in turn comprise preferably PP, polyethylene (PE), polycarbonate (PC), polyvinyl chloride (PVC), an epoxy resin, an isocyanate resin, an acrylate resin, a polyester or a polyamide.

In a third variant of the process, two or more separate pieces of the foamed material are initially charged in step a) and a hollow article is then molded from these in the forming of step d). This variant can also be engineered such that formed pieces having more than one void are obtained. This variant is advantageous in that hollow articles of this type are obtainable without adhesive or subsequent thermal welding. This in turn has the benefit that the resultant hollow article possesses a better combination of stability and weight than hollow articles of the prior art. In addition, the hollow article has a better appearance. This may even extend to the joint between the two original foamed materials scarcely being visible in the final product, if at all. More particularly, the seam formed in the process is scarcely distinguishable from the surrounding material, if at all, and the pore structure is preserved at this joint as well as elsewhere. This process can also take the form of a twin sheet process. In this case, even very complex geometries can be realized with good reproducibility in cycle times of below 5 min.

In an embodiment of the invention, which is slightly modified compared with the third variant, even an individual workpiece of a rigid foam can be vacuum-formed at reduced pressure in very complex workpieces. This process is particularly useful for foam thicknesses to 10 mm. Preferably, transferring the foamed material into the forming tool in step c) is directly preceded or alternatively directly followed by preforming with compressed air in the forming tool.

In principle, these processes can be carried out in a double-shell tool in a further modification. This leads to even higher geometric accuracy. A further immense advantage of the present invention is that the three variants discussed above can also be freely combined with each or one another in one synchronously performed process according to the present invention. For instance, edge-consolidated articles having one or more voids are obtainable. Similarly, composites having a part-consolidated foamed core and/or one or more voids are obtainable.

In general, a clamping frame is used to fix the material in place in the apparatus irrespective of the invention embodiment described to prevent any slippage. For this purpose, the material to be processed extends for example some centimeters beyond the tool rim and is forced down in this region by the clamping frame mentioned.

The rigid foam material which can be processed using the process of the present invention is freely choosable for a person skilled in the art. PMI is a preferred rigid foam material. Such PMI foams are normally produced in a two-step process: a) preparing a cast polymer and b) expanding this cast polymer.

To prepare the cast polymer, the first step is to prepare monomer mixtures comprising (meth)acrylic acid and (meth)acrylonitrile, preferably in a molar ratio between 2:3 and 3:2, as primary constituents. Comonomers can further be used in addition, for example esters of acrylic or methacrylic acid, styrene, maleic acid or itaconic acid, or their anhydrides, or vinylpyrrolidone. The comonomer fraction should not be more than 30% by weight, however. Small amounts of crosslinking monomers, e.g., allyl acrylate, can also be used. However, the amounts should preferably be not more than 0.05% to 2.0% by weight.

The copolymerization mixture further comprises blowing agents which either decompose or evaporate at temperatures of about 150 to 250° C. to form a gas phase. The polymerization proceeds below this temperature, and so the cast polymer contains a latent blowing agent. The polymerization conveniently takes place in slab form between two glass plates.

The cast polymer is then expanded at an appropriate temperature in a second step. The production of such PMI foams is known in principle to a person skilled in the art and can be reviewed in EP 1 444 293, EP 1 678 244 or WO 2011/138060 for example. Rohacell® PMI foams from Evonik Industries AG may be mentioned in particular. Acrylimide foams must be regarded as analogs of PMI foams in respect of production and processing. However, they are distinctly less preferable to other foam materials for toxicological reasons.

PVC foam is a second processable rigid foam. It is widely known from fiber composite technology and sandwich production for rail car construction, the production of wind power systems and from shipbuilding. The final sheets of foam can be processed similarly to PMI foam sheets.

The same applies to PP rigid foams mutatis mutandis. PP foams are particularly well-known as insulation material, in transport containers and as sandwich material. PP foams may contain fillers and are usually commercially available in a density range between 20 to 200 kg/m$^3$.

PU rigid foams in turn are distinguished from PU flexible foams by a less open pore structure and a higher degree of crosslinking. PU rigid foams may additionally contain considerable amounts of inorganic filler materials.

The foamed parts needed are obtainable via a suitable choice of glass plates or via in-mold foaming. They are alternatively obtained by cutting, sawing or milling out of expanded sheets of foam. It may be preferable to cut two or more foamed parts out of one sheet.

The density of the rigid foam material is relatively freely choosable. PMI foams can be used in a density range of 25 to 220 kg/m$^3$ for example.

Sawn, cut or milled pieces of foam core have the advantage over those produced by in-mold foaming that these have open pores at the surface. On contacting the resin-impregnated fibers, some of the as yet incompletely cured resin will penetrate into these open pores at the foam core surface. This has the advantage that particularly strong adherence at the interface between the foam core and the sheathing material is obtained once curing is complete.

In principle, the rigid foam workpieces of the present invention have very many uses. Workpieces obtained by the first variant with local consolidation can also be referred to as foams with integral structures. These, as well as in the additional variant of a composite material, are especially useful in applications contingent upon attachment of force-introducing interfaces with peripheral structures of materials surrounding the (composite) structural component. This applies to any conceivable design in which structural components made of metal or other plastics, for example, are bonded to the foamed material and/or the composite. These prerequisites present particularly in the fields of automotive construction, aerospace technology, ship construction, design of track vehicles, mechanical engineering, medical device engineering, furnituremaking, the building of wind power systems or in elevator construction.

Composite materials of the second variant, even those without integral structures, can find application in particular in mass fabrication e.g. for car body construction or for interior trim in the automotive industry, interior parts in track vehicle or ship construction, in the aerospace industry, in mechanical engineering, in furniture construction or in the design of wind power systems.

Hollow articles comprising rigid foams can in turn be used, for example, in battery casings, air ducts in air conditioners or as aerodynamic subassembly of wind rotor blades (as trailing edges for example). But applications in the abovementioned industries are also conceivable.

KEY TO DRAWINGS

FIG. 1: Fabrication of fiber-reinforced plastics with foamed core
  A: Heating phase; B: Forming
  (1) Top part of forming tool
  (2) Bottom part of forming tool
  (3) Top heater (NIR radiator)
  (4) Bottom heater (NIR radiator)
  (3a) and (4a) Heaters moved out of the way
  (5) Foam core
  (6) Clamping frame
  (7) Outer layers FIG. 2: Producing an integral structure with partial consolidation of foam
  A: Heating phase; B: Forming
  (1) Top part of forming tool
  (2) Bottom part of forming tool
  (3) Top heater (NIR radiator)
  (4) Bottom heater (NIR radiator)
  (3a) and (4a) Heaters moved out of the way
  (5) Foam
  (6) Clamping frame FIG. 3: Forming of hollow articles
  A: Heating phase; B: Forming
  (1) Top part of forming tool
  (2) Bottom part of forming tool
  (3) Top heater (NIR radiator)
  (4) Bottom heater (NIR radiator)
  (3a) and (4a) Heaters moved out of the way
  (5) Foam (here: first workpiece for top part)
  (6) Clamping frame
  (8) Foam (second workpiece for bottom part)

Figure 4:
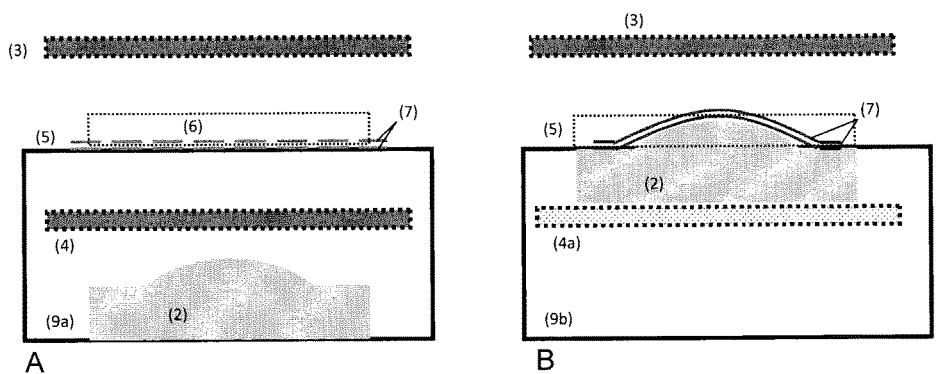

FIG. 4: Vacuum forming of foams
  A: Heating phase; B: Forming
  (2) Bottom part of forming tool
  (3) Top heater (NIR radiator)
  (4) Bottom heater (NIR radiator)
  (4a) Bottom heater moved out of the way
  (5) Foam
  (6) Clamping frame
  (7) Outer layers
  (9a) Machine space under positive pressure
  (9b) Machine space under negative pressure (vacuum)

EXEMPLARY EMBODIMENTS

Some particular embodiments of the invention will now be described in general terms. These also contain examples. Corresponding tests were carried out with success.

Example 1

Fabrication of Fiber-Reinforced Plastics with Foamed Core (Composite Structural Components)

The process is carried out on a twin sheet forming machine such as, for example, the T8 model from Geiss AG. The machine was fitted out in the following configuration:
  Heating fields with flash radiators (NIR; 0.78-1.40 μm)
  Adjustable workspace window
  Height-adjustable top heater
  Molding force 30 metric tons (min.), motor drives
  Heatable and coolable forming mold
  FIG. 1 is referenced to illustrate this embodiment.

In general, the process parameters to be chosen depend on the layout of the equipment used in the individual case. They have to be determined in preliminary tests. The reference temperature $T_F$ depends on the $T_g(S)$ of the PMI foam matrix, on the forming temperature of the outer layers, on the height setting of the top heater $T_g(S) \leq T_F$ (temperature of top heater). The greater the distance between the top heater and the foam matrix, the higher the temperature to which the top heater has to be set. Depending on the formability ($U_g$) of the partial regions of the structural component, radiator field intensity (I) can also be varied. Radiator field intensity I is chosen to be close to 100% at the edge near to the clamping device to ensure continued flow of the material and at the same time sustain the clamped-down state of the material.

Layup of outer layers: Different outer materials can be applied to one side or both sides of the foam core. Examples include drapable wovens/scrims, of from various fiber types or fiber blends fabricated composites (and known as organopanels or -sheets), which are endowed with thermoplastic phases, or thermoplastic outer layers such as PC, PMMA, PVC or other thermoplastically formable plastics capable of being bonded to the foam surface. This may optionally be done using a hot-melt adhesive film or web as adhesion promoter. In a specific example, an 800 μm thick layer of organoplate or -sheet from Bond Laminates (Tepex® Dynalite 102-RG600) was used top and bottom. A further example used Lexan polycarbonate sheet 1500 μm in thickness on both sides.

Procedure: The foam core used was a PMI foam of the Rohacell® S type from Evonik Industries AG with a density of 51 kg/m³ and a thickness of 15 mm. The clamping device should preferably have a mirror finish on the inside surface due to aluminum-type adhesive tape or high-bright stainless steel panels. The format size of outer layers depends on the setting for the window size and is determined such that the outside layers overlap the window by about 5 cm in length and width and thus can be seized by the clamping frame. The foam core to be formed is positioned together with the outer layers above the work window and the clamping frame is lowered to fix it in place.

During the heating to the 210° C. forming temperature of PMI foam, the outer layers can be observed to begin to undulate. At the onset of continued plastification, individual pulses of compressed air are fired in the machine space to prevent sagging down onto the bottom heater. Depending on the requirements of the outer layers, the reference temperature and the intensity of the thermal radiators can be changed after about 3 to 4 min such that the outer materials deform plastically into a drapable state. The reference temperature is then briefly raised by approximately a further 5° C. to endow the material with greater residual heat.

On completion of the heating phase, the bottom and top heating fields are moved out of the operating range of the tool halves and the closing movement of the temperature-controlled tool at a temperature between 120° C. and 150° C. is carried out as quickly as possible. In this way, forming and draping the outer layers along the tool geometry take place in one operation. After the tool has cooled down to below 80° C., the structural component can finally be removed. After the tool has been reheated, fabrication of the next composite structural component can be commenced.

Example 2

Fabrication of Foam Materials with Local Consolidation (Integral Structures)

Figure 2:
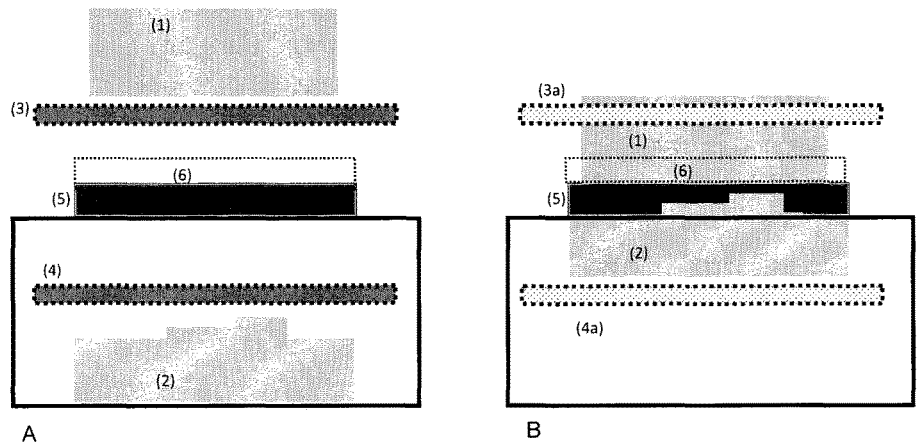

The process is carried out for example on the same Geiss AG model T8 twin sheet forming machine as described in Example 1. Again, the process parameters to be chosen generally depend on the layout of the equipment used in the individual case. The reference temperature $T_E$ is similarly subject to the corresponding remarks in Example 1. FIG. 2 is referenced to illustrate this embodiment.

Procedure: The present example used PMI foam of the Rohacell® IG type from Evonik Industries AG with a density of 110 kg/m³. The initial thickness of the material was 60 mm. Partial consolidation was achieved via raised cones in the tool which consolidated the material partially, to 34 mm thickness, over a diameter of about 25 mm. The tool geometry was also reproduced in other regions of the structural component with narrow radii and considerable degrees of consolidation in the course of a cycle time of about 6 min.

The clamping device should also preferably have a mirror finish on the inside surface due to aluminum-type adhesive tape or high-bright stainless steel panels. The format size of the foam depends on the setting for the window size and is determined such that the foam format overlaps the window by about 5 cm in length and width and thus can be seized by the clamping frame. The foam format to be formed is positioned above the work window and the clamping frame is lowered to fix it in place.

Depending on the degree of partial consolidation, for example in regions in which fittings such as inserts are to be introduced for example, the heat intensity can be adapted. In this specific example, there was an initial heating phase with the flash radiators (NIR; 0.78-1.40 µm) to a temperature of 190° C. At the outset of continued plastification, individual pulses of compressed air are fired in the machine space at foam thicknesses 15 mm to prevent any sagging down onto the bottom heater. After the heating phase, the reference temperature is briefly raised by approximately a further 5-10° C. to endow the material with greater residual heat.

For forming, on completion of the heating phase, the bottom and top heating fields are moved out of the operating range of the tool halves and the closing movement of the temperature-controlled tool at a temperature between 120° C. and 150° C. is carried out as quickly as possible. In this way, forming and the simultaneous consolidation of individual regions of the structural component take place in one operation. In the same operation, inserts can be introduced simultaneously.

After the tool has cooled down to below 80° C., the structural component can finally be removed. After the tool has been reheated, fabrication of the next fiber-plastic composite structural component can be commenced.

Example 3

Forming of Hollow Articles

Figure 3:
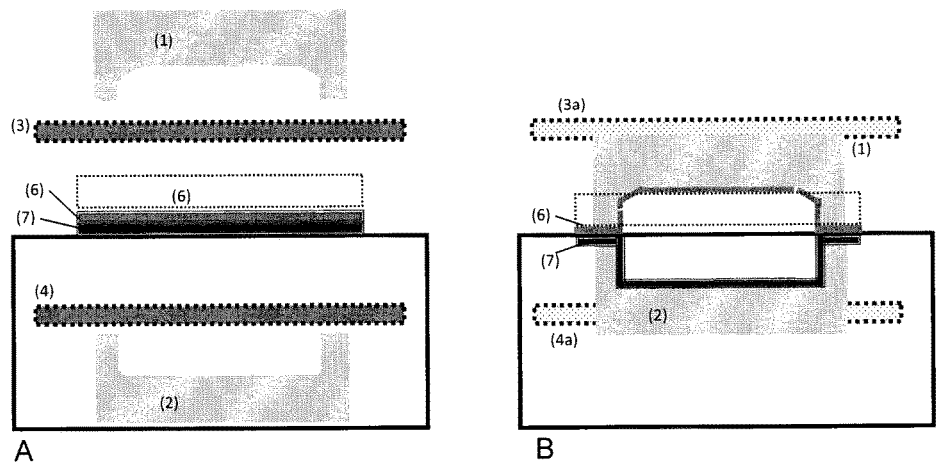

The process is carried out for example on the same Geiss AG model T8 twin sheet forming machine as described in Example 1. Again, the process parameters to be chosen generally depend on the layout of the equipment used in the individual case. The reference temperature $T_F$ is similarly subject to the corresponding remarks in Example 1. FIG. 3 is referenced to illustrate this embodiment.

Procedure: The present example used PMI foam of the Rohacell® IG type from Evonik Industries AG with a density of 110 kg/m³. The initial thickness of the two foam formats was 15 mm in each case.

The clamping device should also preferably have a mirror finish on the inside surface due to aluminum-type adhesive tape or high-bright stainless steel panels. The format size of the foam depends on the setting for the window size and is determined such that the foam format overlaps the window by about 5 cm in length and width and thus can be seized by the clamping frame. Two foam formats are introduced into the twin sheet frame of the machine. The foam formats to be bonded to form a hollow article are positioned above the work window and the clamping frame is lowered to fix it in place.

According to the degree of forming, the heat intensity can be adapted. In this specific example, there was an initial heating phase with the flash radiators (NIR; 0.78-1.40 µm) to a temperature of 195° C. At the onset of continued plastification, individual pulses of compressed air are fired in the machine space at foam thicknesses ≤15 mm to prevent any sagging down onto the bottom heater. After the heating phase, the reference temperature is briefly raised by approximately a further 5-10° C. to endow the material with greater residual heat.

For forming, on completion of the heating phase, the bottom and top heating fields are moved out of the operating range of the tool halves and the closing movement of the temperature-controlled tool at a temperature between 120° C. and 150° C. is carried out as quickly as possible. Forming is effected by sucking the plastically deformable panels of foam onto the tool inside wall of the top and bottom tool. At the same time, design measures on the tool geometry ensure that the foam formats are welded together perimetrically. The hollow article in the process reproduced the tool geometry in a contour-conforming manner and has been welded together at the perimetric edges such that a homogeneous foam structure was formed without seam.

After the tool has cooled down to a temperature of below 80° C., the structural component can be removed. After the tool has been reheated, fabrication of the next fiber-plastic composite structural component can be commenced.

Example 4

Vacuum Forming of Hollow Articles

The process is carried out for example on the same Geiss AG model T8 twin sheet forming machine as described in Example 1. Again, the process parameters to be chosen generally depend on the layout of the equipment used in the individual case. The reference temperature $T_F$ is similarly subject to the corresponding remarks in Example 1. FIG. 4 is referenced to illustrate this embodiment.

Procedure: The present example used PMI foam of the Rohacell® HF type from Evonik Industries AG with a density of 71 kg/m³. The initial thickness of the form format was 5.6 mm. This embodiment of the invention preferably utilizes form formats up to 10 mm in thickness.

The clamping device should also preferably have a mirror finish on the inside surface due to aluminum-type adhesive tape or high-bright stainless steel panels. The format size of the foam depends on the setting for the window size and is determined such that the foam format overlaps the window by about 5 cm in length and width and thus can be seized by the clamping frame. Two foam formats are introduced into the twin sheet frame of the machine. The foam formats to be bonded to form a hollow article are positioned above the work window and the clamping frame is lowered to fix it in place.

According to the degree of forming, the heat intensity can be adapted. In this specific example, there was an initial heating phase with the flash radiators (NIR; 0.78-1.40 μm) to a temperature of 210° C. At the onset of continued plastification, individual pulses of compressed air are fired in the machine space to thereby generate a foam bubble.

For forming, only the bottom heating field is moved out of the operating range of the tool halves after the heating phase has ended, and the forming tool is moved from below underneath the foam bubble. The tool is then positioned under the bubble. The machine space is then evacuated as rapidly as possible. The air column resting thereon causes the foam to be pulled across the tool contour. During the entire course of forming, the top heater remains in its working position to prevent the foam cooling down. After the tool has cooled down to ≤80° C., the structural component can be removed and, after the tool has been heated up again, fabrication of the next structural component can be commenced.

The geometry thus produced, having an inside height of about 260 nm, constitutes the nose segment of a helicopter radome for example.

What is claimed is:

1. A process for forming a rigid foamed material, wherein the rigid foamed material comprises a rigid poly(meth)acrylimide foam, said process comprising:
   preheating the rigid foamed material by irradiation with near infrared radiation having a wavelength between 0.78 and 1.40 μm, to form a heated material;
   forming the heated material with a forming tool, to obtain a formed material; and
   cooling the formed material and demolding to obtain a final workpiece.

2. The process of claim 1, wherein the preheating and the forming occur in two separate tools and the process comprises:
   introducing the rigid foamed material into a machine-side active region of heating fields;
   preheating the rigid foamed material by irradiation with the near infrared radiation having a wavelength between 0.78 and 1.40 μm, to form the heated material;
   transferring the heated material into the forming tool;
   forming the heated material with the forming tool, to obtain the formed material; and
   cooling the formed material and demolding to obtain the final workpiece.

3. The process of claim 1, wherein the preheating and the forming occur in one tool and the process comprises:
   introducing the rigid foamed material into a forming tool equipped with a removable heating field;
   preheating the rigid foamed material by irradiation with the near infrared radiation having a wavelength between 0.78 and 1.40 μm, to form the heated material;
   removing heat from an operating range of the forming tool;
   forming the heated material with the forming tool, to obtain the formed material; and
   cooling the formed material and demolding to obtain the final workpiece.

4. The process of claim 1, wherein the cooling and the demolding occur by a vacuum-forming process.

5. The process of claim 1, wherein the cooling and the demolding provide a local consolidation of the foamed material.

6. The process of claim 1, wherein:
   two or more separate pieces of the rigid foamed material are initially heated; and
   the final workpiece is a hollow article.

7. The process of claim 4, further comprising preforming the preheated material with compressed air either directly before or directly after the forming with the forming tool.

8. The process of claim 4, further comprising constructing the rigid foamed material as a composite ply construction comprising an outer material and a rigid foam core between the outer material,
   wherein the outer material comprises a fiber-reinforced plastic.

9. The process of claim 8, wherein:
   a plastic of the fiber-reinforced plastic comprises a polypropylene, a polyethylene, a polycarbonate, a polyvinyl chloride, an epoxy resin, an isocyanate resin, an acrylate resin, a polyester or a polyamide; and
   a fiber material of the fiber-reinforced plastic comprises carbon, a glass, a polymeric fiber or an aramid fiber.

10. The process of claim 1, further comprising constructing the rigid foamed material as a composite ply construction comprising an outer material and a rigid foam core between the outer material.

11. The process of claim 1, comprising preheating the rigid foamed material to a temperature from 190° C. to 215° C. by irradiation with near infrared radiation having a wavelength between 0.78 and 1.40 μm, to form the heated material.

12. The process of claim 1, comprising preheating the rigid foamed material to a temperature from 190° C. to 210° C. by irradiation with near infrared radiation having a wavelength between 0.78 and 1.40 μm, to form the heated material.

13. The process of claim 1, comprising preheating the rigid foamed material by irradiation with near infrared radiation having a wavelength between 0.78 and 1.40 μm for about 3 minutes to below 6 minutes, to form the heated material.

14. The process of claim 1, comprising preheating the rigid foamed material by irradiation with near infrared radiation having a wavelength between 0.78 and 1.40 μm for about 3 minutes to below 5 minutes, to form the heated material.

* * * * *